United States Patent
Nakano et al.

(10) Patent No.: US 7,631,555 B2
(45) Date of Patent: Dec. 15, 2009

(54) THERMAL FLOWMETER FOR MEASURING A FLOW RATE OF FLUID

(75) Inventors: Hiroshi Nakano, Hitachi (JP);
Masamichi Yamada, Hitachinaka (JP);
Masahiro Matsumoto, Hitachi (JP);
Izumi Watanabe, Hitachinaka (JP);
Keiji Hanzawa, Mito (JP); Keiichi Nakada, Munich (DE)

(73) Assignees: Hitachi, Ltd., Tokyo (JP); Hitachi Car Engineering Co., Ltd., Hitachinaka-shi (JP)

( * ) Notice: Subject to any disclaimer, the term of this patent is extended or adjusted under 35 U.S.C. 154(b) by 0 days.

(21) Appl. No.: 10/580,112

(22) PCT Filed: Nov. 20, 2003

(86) PCT No.: PCT/JP03/14789
§ 371 (c)(1),
(2), (4) Date: Jan. 12, 2007

(87) PCT Pub. No.: WO2005/050143
PCT Pub. Date: Jun. 2, 2005

(65) Prior Publication Data
US 2007/0125169 A1    Jun. 7, 2007

(51) Int. Cl.
*G01F 1/68* (2006.01)
(52) U.S. Cl. .................. 73/204.15; 73/204.26
(58) Field of Classification Search ........... 73/204.26
See application file for complete search history.

(56) References Cited

U.S. PATENT DOCUMENTS

| | | | | |
|---|---|---|---|---|
| 5,616,843 A * | 4/1997 | Schifferl et al. | ......... | 73/204.15 |
| 6,386,030 B1 * | 5/2002 | Liedtke et al. | .......... | 73/204.15 |
| 6,539,793 B2 * | 4/2003 | Tanimoto et al. | ......... | 73/204.15 |
| 6,629,456 B2 * | 10/2003 | Kohno | .............. | 73/204.26 |
| 6,769,298 B2 * | 8/2004 | Matsumura et al. | ..... | 73/204.15 |

(Continued)

FOREIGN PATENT DOCUMENTS

EP    1 316 781 A1    6/2003

(Continued)

OTHER PUBLICATIONS

International Search Report dated Jan. 27, 2004 with an English translation of the pertinent portion (three (3) pages).

(Continued)

*Primary Examiner*—Harshad Patel
(74) *Attorney, Agent, or Firm*—Crowell & Moring LLP

(57) ABSTRACT

A thermal air flowmeter having excellent temperature characteristics and improved measurement accuracy. The thermal air flowmeter includes a temperature sensor disposed in a casing of the air flowmeter, a computing unit for correcting a flow rate detection voltage from a measuring element by using the temperature sensor, and a heating temperature control disposed in a temperature control circuit for performing temperature control of a heating resistor to vary a temperature rise of the heating resistor relative to an air temperature depending on the air temperature. Flow rate detection errors of the thermal air flowmeter caused by an overall temperature change and a temperature change on an intake passage wall surface can be corrected simultaneously and a thermal air flowmeter having superior measurement accuracy can be realized.

5 Claims, 10 Drawing Sheets

U.S. PATENT DOCUMENTS

| | | | |
|---|---|---|---|
| 6,786,088 B2 * | 9/2004 | Matsumura | 73/204.15 |
| 6,871,536 B2 * | 3/2005 | Ariyoshi et al. | 73/204.26 |
| 6,923,053 B2 * | 8/2005 | Yamada et al. | 73/204.26 |
| 6,935,172 B2 * | 8/2005 | Horie et al. | 73/204.15 |
| 7,137,298 B2 * | 11/2006 | Matsumoto et al. | 73/204.26 |

FOREIGN PATENT DOCUMENTS

| | | |
|---|---|---|
| JP | 60-185119 A | 9/1985 |
| JP | 02-027221 | 1/1990 |
| JP | 2002-228501 A | 8/2002 |
| JP | 2002-310762 | 10/2002 |
| JP | 2002-310762 A | 10/2002 |
| JP | 3366818 B2 | 11/2002 |
| JP | 2003-083788 | 3/2003 |
| JP | 2003-240620 | 8/2003 |
| WO | WO 01/98736 A1 | 12/2001 |
| WO | WO 2001/98736 A1 | 12/2001 |

OTHER PUBLICATIONS

European Search Report dated Feb. 11, 2008 (Three (3) Pages).

* cited by examiner

⟨ TABLE 1 ⟩

CORRECTION MAP FOR USE IN PRIOR ART

| | | AIR FLOW RATE | | |
|---|---|---|---|---|
| | | 5kg/h | 10kg/h | 100kg/h |
| TEMPERATURE OF TEMPERATURE SENSOR | -40°C | -7 % | -5 % | -1 % |
| | 20°C | 0 % | 0 % | 0 % |
| | 80°C | + 7 % | +5 % | +1 % |

< TABLE 2 >

CORRECTION MAP FOR USE IN INVENTION

| | | AIR FLOW RATE | | |
| --- | --- | --- | --- | --- |
| | | 5kg/h | 10kg/h | 100kg/h |
| TEMPERATURE OF TEMPERATURE SENSOR | -40°C | -12 % | -11.5 % | -11 % |
| | 20°C | 0 % | 0 % | 0 % |
| | 80°C | +12 % | +11.5 % | +11 % |

THERMAL FLOWMETER FOR MEASURING A FLOW RATE OF FLUID

TECHNICAL FIELD

The present invention relates to a thermal flowmeter of a fluid, and more particularly to a thermal flowmeter of a fluid suitable for measuring an intake air amount in an internal combustion engine.

BACKGROUND ART

As one example of fluid flowmeters, there is an air flowmeter disposed in an electronically controlled fuel injector of an internal combustion engine for an automobile, for example, to measure an intake air amount. Such an air flowmeter is mainly practiced in the thermal type because of a capability of directly detecting a mass flow rate.

Among thermal air flowmeters, particularly a thermal air flowmeter employing a measuring element manufactured by the semiconductor micromachining technology has received attention for the reasons that it can be manufactured at a reduced cost and can be driven with lower power.

One known thermal air flowmeter using a semiconductor substrate is disclosed in JP,A 2002-310762. The technique disclosed in that publication places primary importance to a reduction of variations in manufacturing and reliability against changes over time.

In the disclosed invention, a heating resistor, a temperature compensation resistor, and other resistors used in a bridge circuit are formed of the same resistor material on the same semiconductor substrate in an integrated state.

With that construction, heater control with high accuracy can be performed. Even if the resistance values and resistivities of those resistors are changed with the lapse of time, the extents of the changes can be regarded as being the same because those resistors are formed of the same resistor material, whereby the balanced state of the bridge circuit can be maintained. As a result, stable characteristics can be obtained for a long term.

DISCLOSURE OF THE INVENTION

The above-described prior art is able to perform optimum heating control for temperature changes of an airflow. However, when the prior-art flowmeter is used in an internal combustion engine of an automobile or the like, the accuracy in measuring an air flow rate is deteriorated by thermal influences applied externally of the thermal air flowmeter due to heat generated by the internal combustion engine.

More specifically, in the thermal air flowmeter used under severe temperature conditions occurred in an automobile, etc., heat is conducted to the measuring element through a support portion of the thermal air flowmeter with a temperature rise of an internal combustion engine, thus raising the temperature of air to be detected near the measuring element. Therefore, the flow rate is measured as a smaller value than the actual one, and the measurement accuracy is deteriorated.

That cause of deteriorating the measurement accuracy has not been recognized and no countermeasures have been taken in the prior art.

An object of the present invention is to reduce errors in measurement accuracy of a fluid flowmeter caused by external thermal influences, and to provide a thermal flowmeter of a fluid with improved accuracy in measurement of a flow rate.

To achieve the above object, the present invention is constituted as follows.

(1) A thermal flowmeter of a fluid comprises a flow rate measuring element disposed in a fluid passage and including a heating resistor generating heat with supply of a current, a temperature compensation resistor for detecting a fluid temperature, a first temperature measuring resistor for measuring a temperature upstream of the heating resistor, and a second temperature measuring resistor for measuring a temperature downstream of the heating resistor, all of the resistors being formed on the same substrate.

In the thermal flowmeter of the fluid, a temperature sensor measures a temperature in a casing which is supported to a wall surface of an intake pipe forming the fluid passage and which supports the flow rate measuring element. The flowmeter further comprises heating temperature control means causing a difference between the fluid temperature and the temperature of the heating resistor to be changed depending on the fluid temperature. A computing unit performs correction depending on temperature by using signals corresponding to a fluid flow rate sent from the first and second temperature detecting resistors and the temperature sensor.

(2) In above (1), preferably, the heating temperature control means forms a bridge circuit in cooperation with the heating resistor, the temperature compensation resistor, the first resistor, and the second resistor, and the temperature compensation resistor differs in resistance temperature coefficient from the heating resistor, the first resistor, and the second resistor, thereby causing the heating temperature to be lowered as the air temperature rises.

(3) In above (1) or (2), preferably, the heating resistor, the temperature compensation resistor, the first resistor, and the second resistor are all made of the same resistor material and form a bridge circuit, and a fixed resistor differing in resistance temperature coefficient from the resistor material is connected to the temperature compensation resistor in parallel.

(4) A thermal flowmeter of a fluid according to another aspect of the present invention comprises a flow rate detecting element disposed in a fluid passage and including a heating resistor generating heat with supply of a current, and first and second temperature detecting resistors for measuring respective temperatures upstream and downstream of the heating resistor, all of the resistors being formed on the same substrate.

The thermal flowmeter of the fluid further comprises a temperature control circuit for controlling a temperature of the heating resistor; a flow rate detecting circuit for taking out signals corresponding to a fluid flow rate from the first and second temperature detecting resistors; a casing supported to a wall surface of an intake pipe forming the fluid passage and supporting the flow rate measuring element; a temperature sensor for measuring a temperature in the casing; a computing unit for receiving the signals corresponding to the fluid flow rate from the first and second temperature detecting resistors, performing correction depending on temperature by using the temperature sensor, and outputting the corrected result; and flow rate detecting means causing an offset voltage provided as an output voltage of the flow rate detecting circuit at a flow rate of zero to be changed depending on an ambient temperature.

(5) In above (4), preferably, the flow rate detecting means includes a serial circuit of the first temperature measuring resistor and the second temperature measuring resistor, and the first temperature measuring resistor and the second temperature measuring resistor have different resistance temperature coefficients from each other.

(6) In above (4) or (5), preferably, the flow rate detecting means includes a serial circuit of the first temperature measuring resistor and the second temperature measuring resistor both having the same resistance temperature coefficient, and a fixed resistor differing in resistance temperature coefficient from the first and the second temperature measuring resistors is connected to the second temperature measuring resistor in parallel.

BEST MODE FOR CARRYING OUT THE INVENTION

Embodiments of the present invention will be described below with reference to the attached drawings. The following description is made of the case where the present invention is applied to a thermal air flowmeter.

Figure 1:
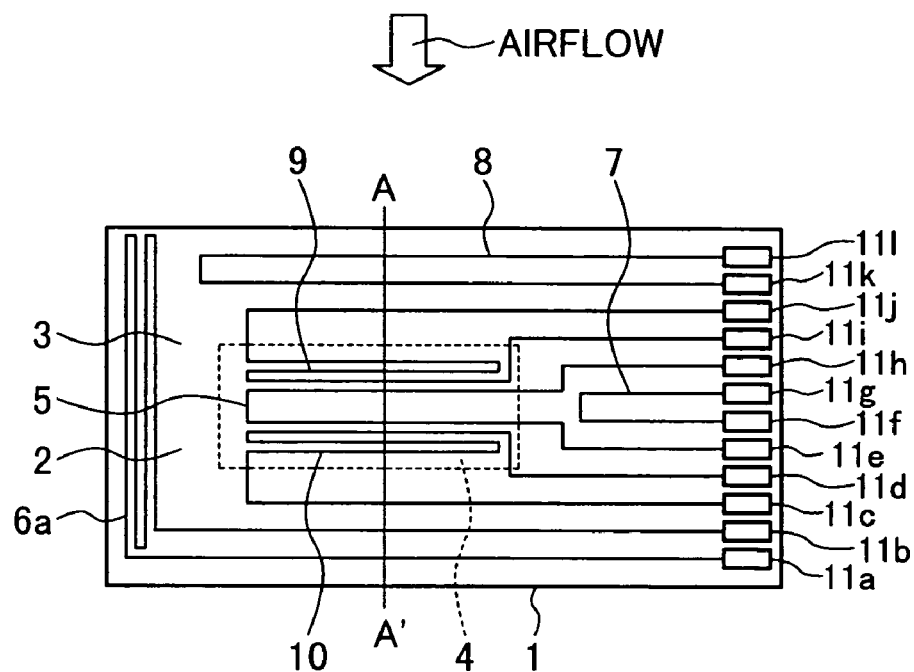
FIG. 1 is a plan view showing a measuring element of a thermal air flowmeter according to a first embodiment of the present invention.
Figure 2:
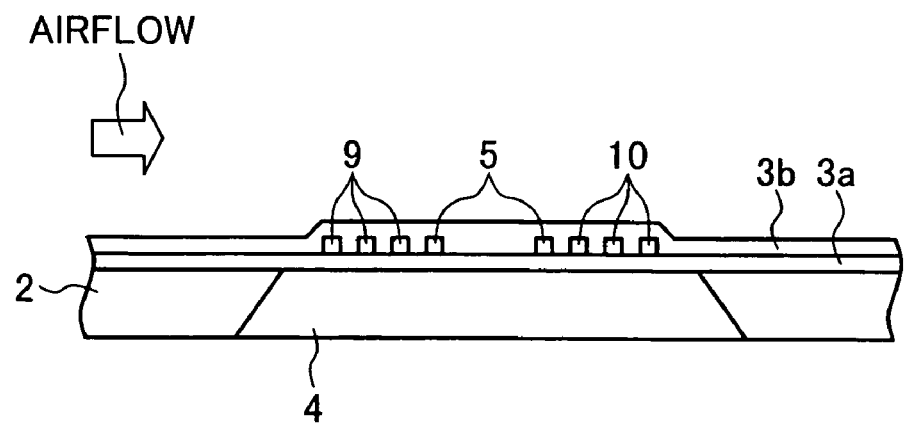
FIG. 2 is a sectional view of the measuring element taken along the line A-A' in FIG. 1.

FIG. 1 is a plan view showing a measuring element of a thermal air flowmeter according to a first embodiment of the present invention. FIG. 2 is a sectional view of the measuring element taken along the line A-A' in FIG. 1.

Referring to FIGS. 1 and 2, a measuring element 1 comprises a semiconductor substrate 2 made of, e.g., silicon and having a cavity 4 formed by anisotropic etching to extend upward from a lower surface of the substrate to a boundary with respect to an electric insulating film 3a, and a heating resistor 5 formed on the electric insulating film 3a that covers the cavity 4. The measuring element 1 further comprises a temperature compensation resistor 6a for performing temperature compensation of the heating resistor 5, a first resistor 7, and a second resistor 8, the first and second resistors forming a bridge circuit in combination with the heating resistor 5 and the temperature compensation resistor 6a.

On the measuring element 1, a first temperature measuring resistor 9 and a second temperature measuring resistor 10 are formed to detect the temperatures upstream and downstream of the heating resistor 5 in the vicinity thereof, respectively, thus obtaining a signal corresponding to the air flow rate. In addition, the measuring element 1 includes terminal electrodes 11 (11a-111) made of, e.g., aluminum and connecting the measuring element 1 to a drive circuit for outputting of a flow rate detection voltage, and an electric insulating film 3b for protection of the various resistors.

Materials used for forming the resistors on the measuring element 1 can be selected from among polysilicon, platinum, gold, copper, aluminum, etc. In this first embodiment, the resistors on the measuring element 1 are formed using inexpensive polysilicon.

Figure 3:
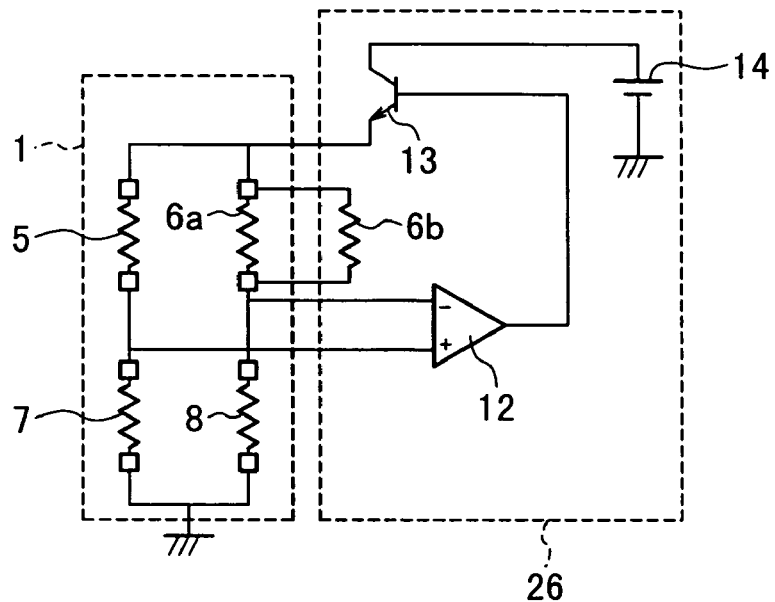
FIG. 3 is a diagram of a drive circuit for supplying a current to a heating resistor on the measuring element and performing heating temperature control.

FIG. 3 is a diagram of a drive circuit for supplying a current to the heating resistor 5 on the measuring element 1 and performing heating temperature control. Referring to FIG. 3, the drive circuit comprises the heating resistor 5 formed on the measuring element 1, the first resistor 7 connected to the heating resistor 5 in series, the temperature compensation resistor 6a, the second resistor 8 connected to the temperature compensation resistor 6a in series, and a fixed resistor 6b disposed on a circuit board 26 and connected to the temperature compensation resistor 6a in parallel. The resistors 5 and 7 are connected to the resistors 6a and 8 in parallel, to thereby constitute a bridge circuit.

The drive circuit further comprises a differential amplifier 12 which is connected to a junction between the resistors 5 and 7 and a junction between the resistors 6a and 8 and which amplifies the differential voltage of the bridge circuit, a transistor 13 having a base supplied with an output voltage from the differential amplifier 12 and an emitter connected to a junction between the resistors 6a and 5, thereby controlling the current supplied to the bridge circuit, and a power supply 14 connected between a collector of the transistor 13 and a ground.

Assuming that the resistance value of the heating resistor 5 is Rh, the resistance value of the temperature compensation resistor 6a is Rc, the resistance value of the fixed resistor 6b is Rf, the resistance value of the first resistor 7 is Ra, and the resistance value of the second resistor 8 is Rb, the drive circuit operates so as to satisfy the following formula (1):

$$Rh \times Rb = (Rc//Rf) \times Ra \quad (1)$$

Because the heating resistor 5 is thermally insulated, it generates heat with the supply of a current. Assuming that the resistance temperature coefficient of polysilicon is $\alpha s$ (ppm/° C.), the temperature of the heating resistor 5 is Th (° C.), and the substrate temperature of the measuring element 1 is Tc, the temperature Th of the heating resistor is obtained from the following formulae (2) and (3):

$$Rh(1+\alpha sTh) \times Rb(1+\alpha sTc) = (Rc(1+\alpha sTc))//Rf \times Ra(1+\alpha sTc) \quad (2)$$

$$Th = ((Rc(1+\alpha sTc))//Rf \times Ra \times Rh/(RbRh) - 1)/\alpha s \quad (3)$$

In the above-described drive circuit, the fixed resistor 6b connected to the temperature compensation resistor 6a in parallel serves as heating temperature control means added in the first embodiment of the present invention.

In the prior art, the drive circuit comprises the heating resistor 5, the temperature compensation resistor 6a, the first resistor 7, and the second resistor 8. These resistors are all made of the same resistor material and hence have the same resistance temperature coefficient (1200 ppm/° C.). However, the drive circuit according to the first embodiment of the present invention includes, in addition to those resistors 5, 6a, 7 and 8, the fixed resistor 6b having the resistance temperature coefficient of substantially 0 ppm/° C. and connected to the temperature compensation resistor 6a in parallel.

Figure 4:
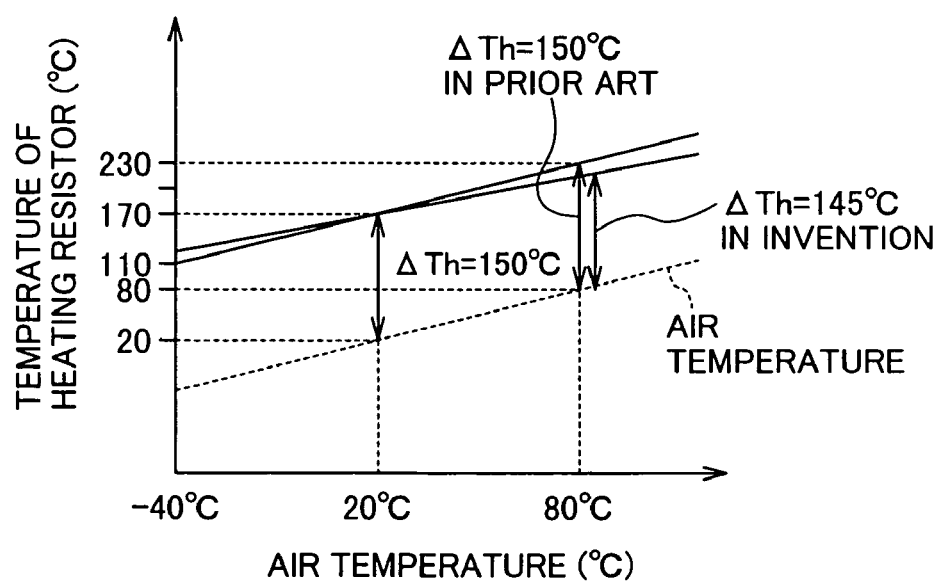
FIG. 4 is a graph representing, in comparison with the prior art, the temperature of the heating resistor relative to the air temperature when the drive circuit according to the present invention is operated.

The resistance value of the fixed resistor 6b is required to be about 20 times that of the temperature compensation resistor 6a. FIG. 4 is a graph representing, in comparison with the prior art, the temperature of the heating resistor 5 relative to the air temperature when the drive circuit according to the present invention is operated.

As seen from FIG. 4, in the prior art, the temperature of the heating resistor 5 is controlled such that it is always higher than the air temperature, indicated by a dotted line, by a constant temperature. More specifically, in the prior art, when the air temperature is 20° C., the temperature of the heating resistor 5 is 170° C. and it is raised by 150° C. (i.e., ΔTh=150° C.) relative to the air temperature. Further, in the prior art, ΔTh=150° C. is kept even when the air temperature is 80° C.

On the other hand, in the drive circuit according to the first embodiment of the present invention, when the air temperature is 20° C., the temperature of the heating resistor 5 is 170° C. and ΔTh=150° C. is held as in the prior art. However, when the air temperature rises to 80° C., ΔTh of the heating resistor 5 is reduced due to the effect of the fixed resistor 6b, thus resulting in ΔTh=145° C. The heating temperature is thereby lowered.

Stated another way, when the air temperature is changed from 20° C. to 80° C., ΔTh is reduced by 5° C. and sensitivity in flow rate detection is reduced correspondingly. Thus, in the drive circuit according to the present invention, the temperature of the heating resistor 5 can be adjusted depending on the air temperature, and the sensitivity in flow rate detection can also be adjusted. The effect of the sensitivity adjustment will be described later.

In practice, the resistance value of each resistor formed on the measuring element 1 by using polysilicon has a manufacturing variation of about ±20%. Therefore, when control with higher accuracy is required, the additionally-connected fixed resistor 6b is preferably formed using a printed resistance, for example, such that its resistance value can be adjusted by, e.g., laser trimming.

Also, the additionally-connected fixed resistor 6b may be connected to the temperature compensation resistor 6a in series or to the first resistor 7. Such a modification can also provide a similar advantage.

Figure 5:
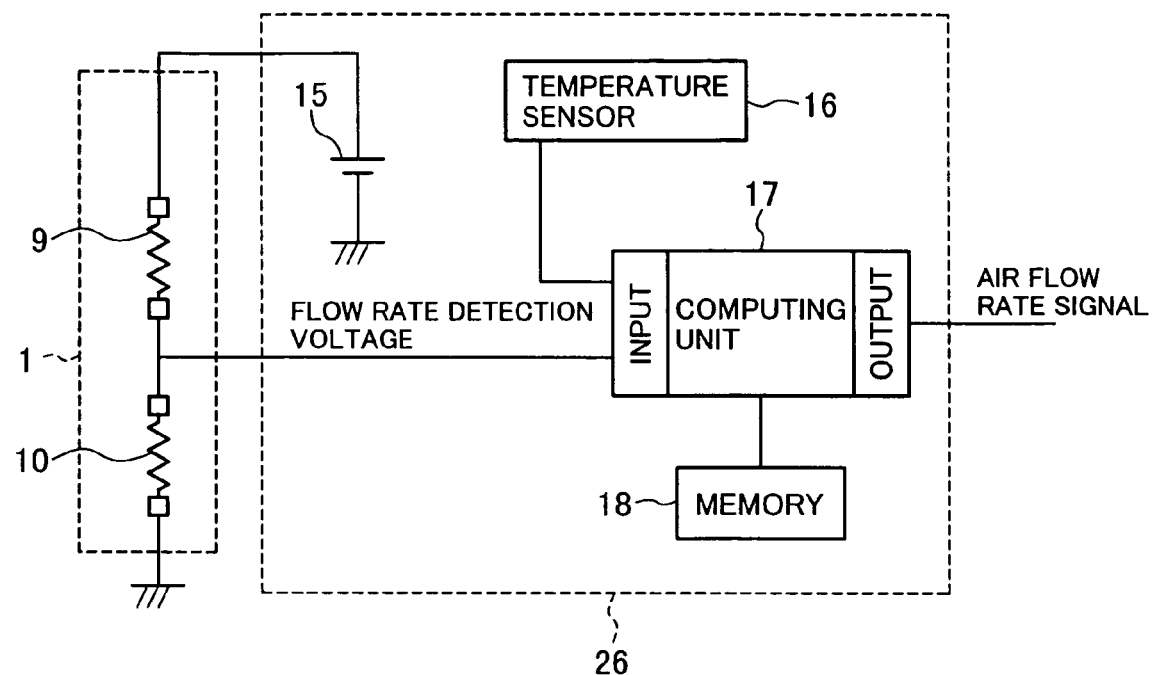
FIG. 5 is a circuit diagram for detecting a flow rate according to the present invention.

FIG. 5 is a diagram of a flow rate detection circuit for detecting the air flow rate from the first temperature measuring resistor 9 and the second temperature measuring resistor 10 which detect the temperatures upstream and downstream of the heating resistor 5, respectively, and a computing unit for correcting and outputting the flow rate detection voltage based on information from a temperature sensor disposed inside the thermal air flowmeter.

Referring to FIG. 5, the flow rate detection circuit is constituted by connecting a reference voltage source 15 to a serial circuit of the first temperature measuring resistor 9 and the second temperature measuring resistor 10. The first temperature measuring resistor 9 and the second temperature measuring resistor 10 are each made of polysilicon similarly to the heating resistor 5.

When air flows over the measuring element 1, the first temperature measuring resistor 9 upstream of the heating resistor 5 is cooled and its resistance value is reduced. Because air warmed by the heating resistor 5 flows over the second temperature measuring resistor 10 downstream of the heating resistor 5, the second temperature measuring resistor 10 is heated and its resistance value is increased.

Accordingly, a signal corresponding to the air flow rate (i.e., the flow rate detection voltage) can be obtained by taking out a voltage change in the serial circuit of the resistors 9 and 10.

The flow rate detection voltage taken out as the voltage change of the resistors 9 and 10 is supplied to the computing unit 17. Also, supplied to the computing unit 17 is a temperature detection signal from a temperature sensor 16 which is disposed inside the thermal air flowmeter to correct temperature characteristics of the drive circuit, etc. and which measures the representative temperature of the thermal air flowmeter. The computing unit 17 corrects the flow rate detection voltage based on temperature information from the temperature sensor 16. Further, a memory 18 storing correction information, such as the relationship between the flow rate detection voltage and the temperature from the temperature sensor 16, is connected to the computing unit 17. The computing unit 17 computes the air flow rate with high accuracy based on the information stored in the memory 18, and then outputs the computed air flow rate signal.

Figure 6:
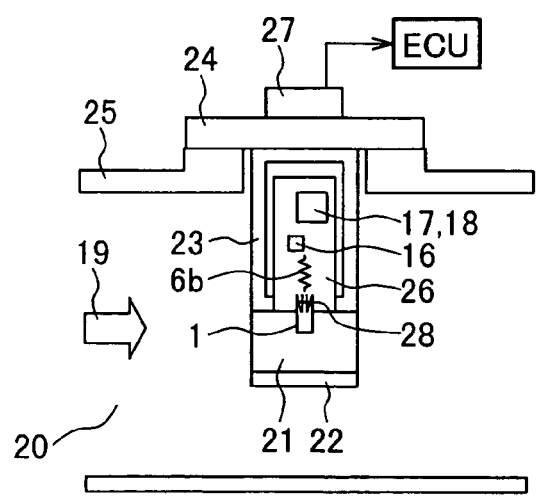
FIG. 6 is a schematic sectional view showing a state where the thermal air flowmeter is mounted in an intake passage of an internal combustion engine.

FIG. 6 is a schematic sectional view showing a state where the thermal air flowmeter for measuring the flow rate of intake air supplied to the internal combustion engine is mounted in an intake passage of the internal combustion engine for, e.g., an automobile. Referring to FIG. 6, the measuring element 1 is installed in a sub-passage 21 disposed inside a main passage 20 through which intake air 19 flows. A member 22 forming the sub-passage 22 is supported by a casing 23.

The measuring element 1 is supported by the circuit board 26 disposed inside the casing 23 and is electrically connected to the drive circuit through gold wire bonding 28, etc. The casing 23 is mounted to an intake passage wall surface 25 by a mount support 24.

Further, the casing 23 contains therein the drive circuit and the flow rate detection circuit which are adapted for driving the measuring element 1 and taking out the flow rate signal, the temperature sensor 16 for detecting the representative temperature of the thermal air flowmeter, and the circuit board 26 mounting thereon the computing unit 17 and the memory 18 which are adapted for correcting the flow rate detection voltage.

The fixed resistor 6b is also disposed on the circuit board 26. The air flow rate signal measured by the thermal air flowmeter is sent via a connector 27 to a computer (ECU) for executing engine control.

While in the first embodiment the temperature on the circuit board 26 is used as the representative temperature of the thermal air flowmeter, the temperature sensor 16 may be disposed on the mount support 24, for example, outside the circuit board 26 at a position nearer to the intake passage wall surface 25.

In that case, however, because the temperature sensor 16 is disposed outside the circuit board 26, wiring has to be additionally laid and mounting of the temperature sensor 16 is complicated correspondingly. Thus, the temperature sensor 16 is preferably disposed integrally with the circuit board 26 from points of realizing simpler mounting and cost efficiency.

Meanwhile, in the internal combustion engine used in the automobile, the temperature of the intake air supplied to the internal combustion engine is required to be detected with accuracy in the range of −40° C. to +80° C. under heating by the internal combustion engine.

Also, on condition that the temperature of the intake air and the temperature of the thermal air flowmeter are equal to each other in the above temperature range, there is a first condition of such a temperature characteristic that temperature varies in the range of −40° C. to +80° C. (hereinafter such a temperature condition is referred to as an "overall temperature" and a flow rate detection error in the thermal air flowmeter caused due to that temperature characteristic is referred to as an "overall temperature characteristic"). Further, there is a second condition of such a temperature characteristic that, at the air temperature of 20° C., the temperature of the intake passage wall surface 25 becomes 80° C., thus resulting in a state where heat is conducted from the intake passage wall surface 25 to the thermal air flowmeter (hereinafter that temperature condition is referred to as a "wall surface temperature" and a flow rate detection error in the thermal air flowmeter caused due to that temperature characteristic is referred to as a "wall surface temperature characteristic"). Under any of the first condition and the second condition, the accuracy in the flow rate detection of the thermal air flowmeter has to be ensured.

Under those temperature conditions, the prior art can correct the error caused due to the overall temperature characteristic based on the information from the temperature sensor 16, thereby ensuring the accuracy in the flow rate detection, but it cannot correct the error caused due to the wall surface temperature characteristic. This is because, as mentioned above, the influence of a rise of the wall surface temperature caused by heat generated from the internal combustion engine upon the accuracy in the air flow rate detection has not been recognized in the past.

According to the present invention, even under the above two temperature conditions, it is possible to correct the flow rate detection error and to ensure the flow rate measurement with high accuracy by using the temperature sensor 16 in the air flowmeter and the heating temperature control means for performing temperature control of the heating resistor 5 (i.e., the drive circuit, shown in FIG. 3, including the additionally-connected fixed resistor 6b in this first embodiment).

The reason why the present invention is able to measure the flow rate with high accuracy will be described below in comparison with the prior art.

First, the overall temperature characteristic in the thermal air flowmeter of the prior art is described.

Figure 7:
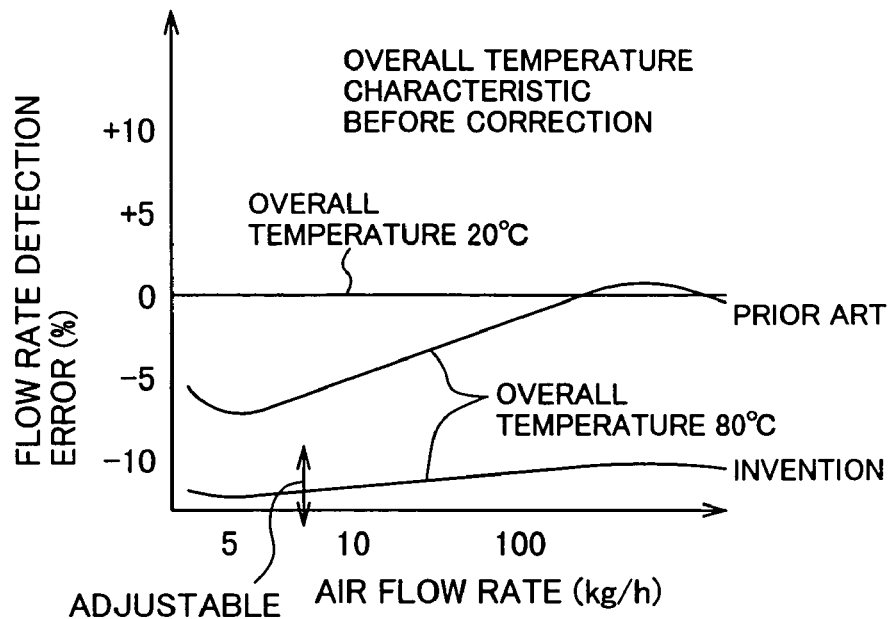
FIG. 7 is a graph representing a flow rate detection error caused due to an overall temperature characteristic of a flow rate detection voltage before correction.

FIG. 7 is a graph representing the flow rate detection error caused due to the overall temperature characteristic of the flow rate detection voltage before correction. Here, the flow rate detection error is obtained by converting a variation of the flow rate detection voltage, which is caused when the overall temperature is changed from 20° C. to 80° C., to an error in terms of flow rate.

As shown in FIG. 7, the flow rate detection error caused due to the overall temperature characteristic is changed depending on the air flow rate. In the prior art, the flow rate detection error is maximized as large as about −7% at a low flow rate of 5 kg/h.

Figure 8:
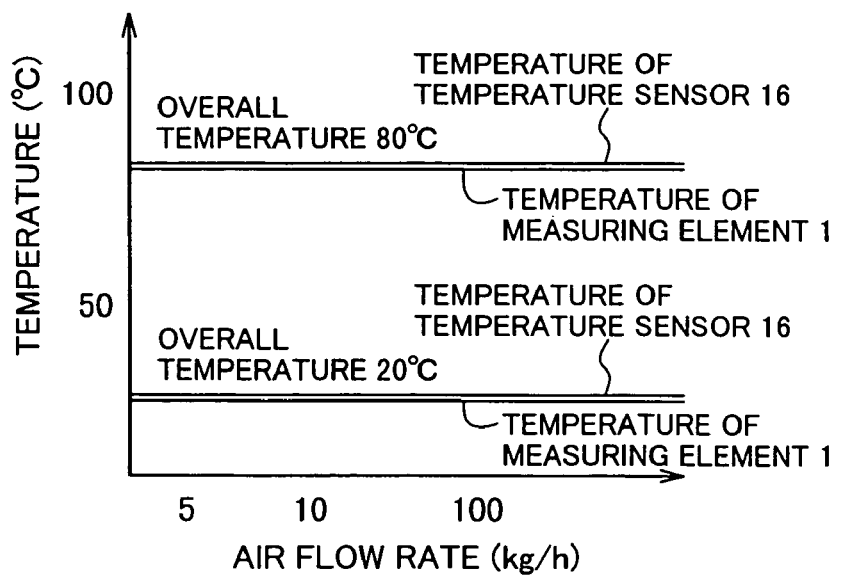
FIG. 8 is a graph representing temperature changes of the measuring element and a temperature sensor with respect to changes of an air flow rate.

FIG. 8 is a graph representing temperature changes of the measuring element 1 and the temperature sensor 16 with respect to changes of the air flow rate under the above-described temperature conditions. As shown in FIG. 8, since the temperature of the intake air and the temperature of the intake passage wall surface 25 are the same in the overall temperature characteristic, the temperatures of the temperature sensor 16 and the measuring element 1 are the same as the overall temperature regardless of whether the overall temperature is 80° C. or 20° C.

On the other hand, in the overall temperature characteristic in the present invention, the effect of the fixed resistor 6b acts to make smaller the temperature rise of the heating resistor 5 than that in the prior art when the air temperature rises, and the sensitivity in the flow rate detection is adjusted to become smaller (see FIG. 4).

In the present invention, therefore, with a reduction of the sensitivity in the flow rate detection, the flow rate detection error caused due to the overall temperature characteristic when the overall temperature is changed from 20° C. to 80° C. is increased toward the negative side in comparison with that in the prior art.

Thus, according to the present invention, the flow rate detection error caused due to the overall temperature characteristic is adjustable and the temperatures of the measuring element 1 and the temperature sensor 16 are the same on that occasion as shown in FIG. 8.

Figures 9, 10:
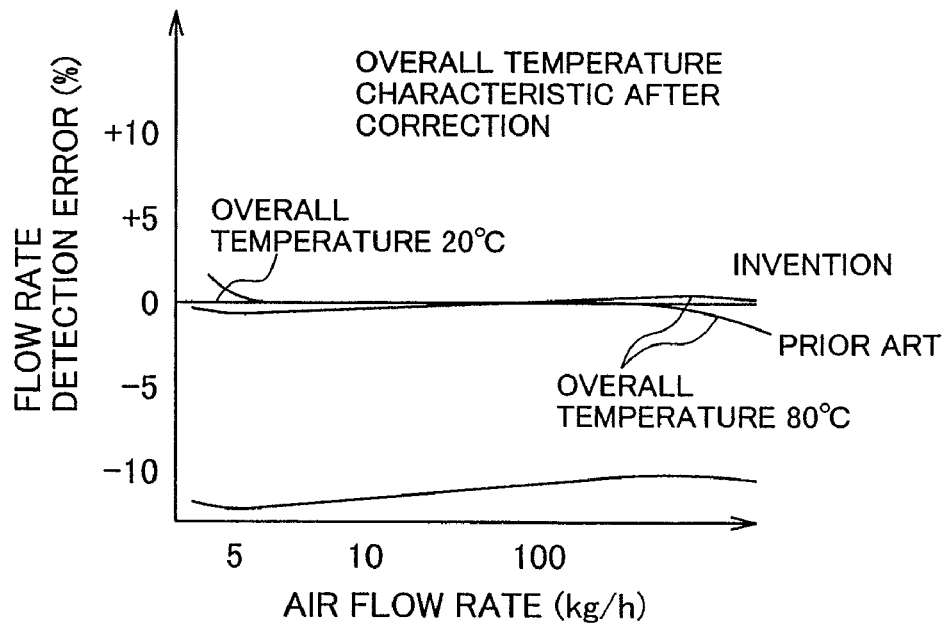
FIG. 9 is a graph representing overall temperature characteristics after correction.
FIG. 10 is a table showing a correction map for a computing unit in the prior art.

In any of the prior art and the present invention, the overall temperature characteristic can be corrected by using the information from the temperature sensor 16 and the computing unit 17. The computing unit 17 reduces the flow rate detection error by adding a correction amount to the flow rate detection voltage so that the flow rate detection error caused due to the overall temperature characteristic, shown in FIG. 7, is 0%. FIG. 9 is a graph representing the overall temperature characteristic after correction.

The correction amount applied to the flow rate detection voltage means a correction amount computed by the computing unit 17 based on the temperature information from the temperature sensor 16 by using a map indicating the relationship between the temperature of the temperature sensor 16 and the air flow rate (i.e., a correction map). The correction map is stored in the memory 18.

Figures 11, 12:
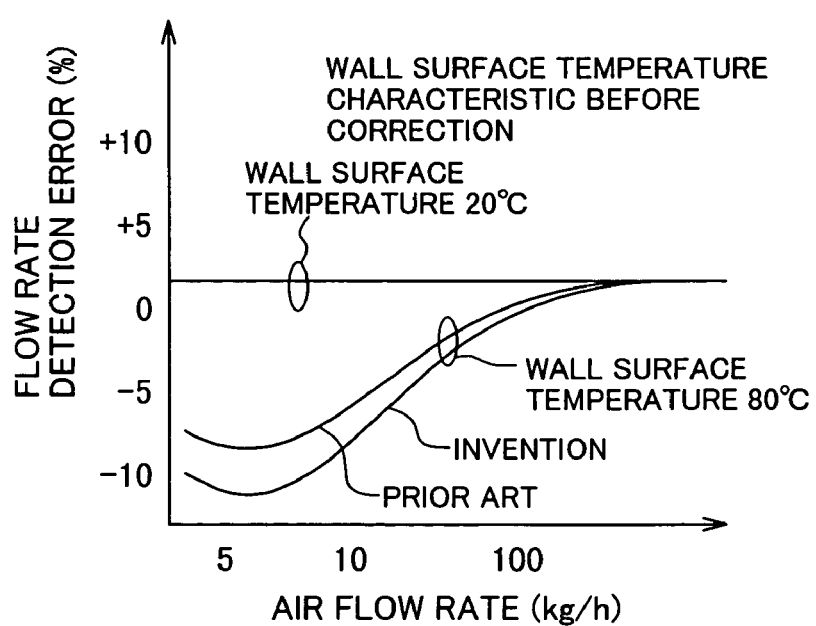
FIG. 11 is a table showing a correction map for a computing unit in the present invention.
FIG. 12 is a graph representing a flow rate detection error caused due to a wall surface temperature characteristic of the thermal air flowmeter.

Table 1 shown in FIG. 11 represents a correction map for use in the prior art, and Table 2 shown in FIG. 12 represents a correction map for use in the present invention. As seen from comparing FIGS. 11 and 12, correction amounts set in the correction map for use in the present invention are larger than those set in the correction map for use in the prior art. The correction amounts in the present invention are set larger than those in the prior art in consideration of that, as described above, the flow rate detection error is increased in the present invention when the temperature is raised with heat generated from the internal combustion engine, or when the temperature is lowered with an influence of the external temperature.

While the first embodiment of the present invention employs the correction method using a map, the correction may be performed by using a function modeled from the correction map, and this modification can also provide a similar advantage.

The wall surface temperature characteristic will be described below with comparison between the prior art and the present invention.

FIG. 12 is a graph representing a flow rate detection error caused due to the wall surface temperature characteristic of the flow rate detection voltage before correction by the computing unit 17. In FIG. 12, the flow rate detection error is obtained by converting a variation of the flow rate detection voltage, which is caused when the temperature of the intake air is held at 20° C. and the temperature of the intake passage wall surface 25 is raised from 20° C. to 80° C., to an error in terms of flow rate.

Figure 13:
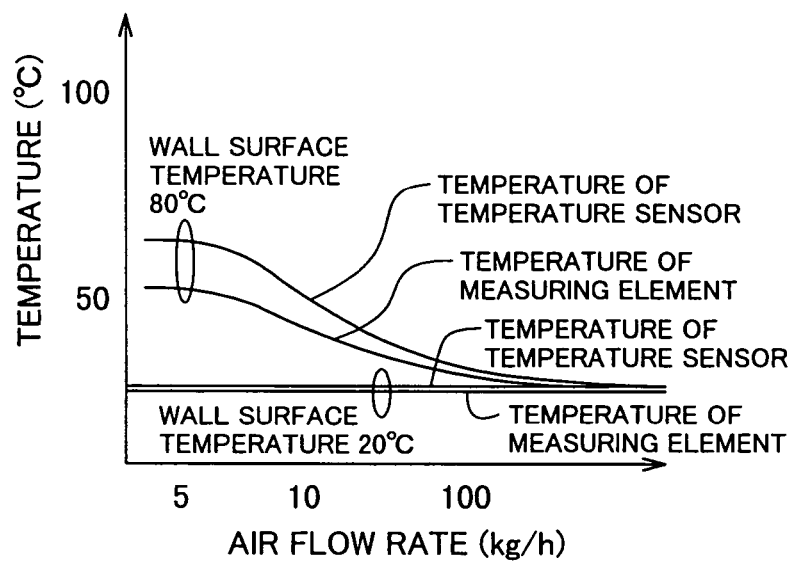
FIG. 13 is a graph representing temperature changes of the temperature sensor and the measuring element depending on the wall surface temperature characteristics of the thermal air flowmeter.

FIG. 13 is a graph representing temperature changes of the temperature sensor 16 and the measuring element 1 with respect to changes of the air flow rate when the wall surface temperature is 20° C. and 80° C.

In the case of the wall surface temperature characteristic, the temperature is higher at a position nearer to the wall surface. Therefore, when the wall surface temperature is 80° C., the temperature of the temperature sensor 16 is higher than that of the measuring element 1. Also, as the air flow rate increases, the temperature is gradually lowered with the heat radiation effect and comes closer to the air temperature.

In the prior art, as shown in FIG. 12, the flow rate error caused due to the wall surface temperature characteristic is maximized as large as −10% at a low flow rate of 5 kg/h and is gradually reduced as the air flow rate increases. The reason is that, as the air flow rate increases, the effect of dissipating the heat, which is conducted from the intake passage wall surface 25 to the thermal air flowmeter, is increased and the temperature of the measuring element 1 is lowered correspondingly.

On the other hand, according to the wall surface temperature characteristic in the present invention, the flow rate error caused due to the wall surface temperature characteristic is maximized as large as about −12.5% at a low flow rate of 5 kg/h and is gradually reduced as the air flow rate increases.

The wall surface temperature characteristic before correction in the present invention is deteriorated −2.5% at maximum from that in the prior art. The reason is that, as the temperature of the measuring element 1 rises, the effect of the fixed resistor 6b for reducing the temperature rise of the heating resistor 5 also appears in the wall surface temperature characteristic.

Figure 14:
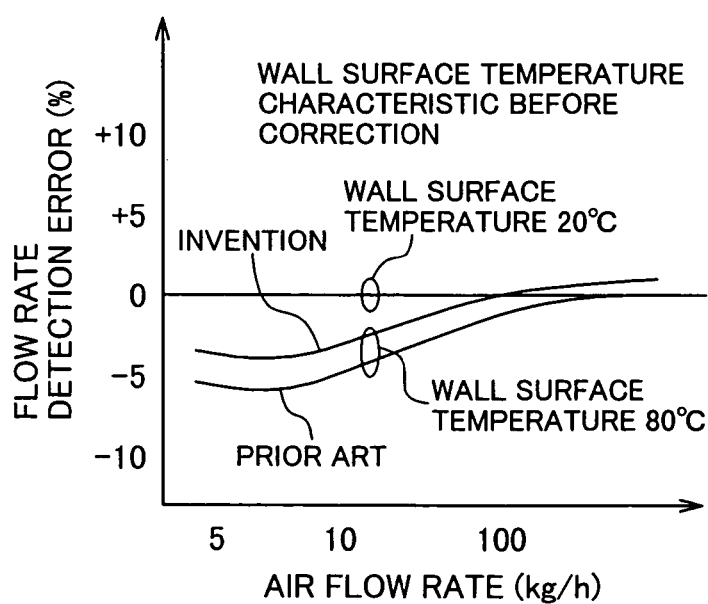
FIG. 14 is a graph representing the wall surface temperature characteristics of the thermal air flowmeter after correction.

The above-described wall surface temperature characteristic is a characteristic of the flow rate detection voltage inputted to the computing unit 17, and it is corrected by using the information from the temperature sensor 16 and the correction map stored in the memory 18, as shown in a graph of FIG. 14, similarly to the case of the overall temperature characteristic.

As seen from FIG. 14, in the prior art, the flow rate error caused due to the wall surface temperature characteristic after correction is not reduced to 0% completely and remains about −5% at the flow rate of 5 kg/h. This is because a sufficient correction amount cannot be obtained for the wall surface temperature characteristic in spite of using the correction map shown in FIG. 10. More specifically, as shown in FIG. 13, when the wall surface temperature is 80° C., the temperature of the temperature sensor 1 at the flow rate of 5 kg/h is about 60° C. Based on FIG. 10, the correction amount at that temperature is about 4.7%, i.e., ((60° C.−20° C.)×7%/(80° C.−20° C.)).

In the prior art, therefore, because the flow rate detection error caused due to the wall surface temperature characteristic before correction is −10% (at 5 kg/h, see FIG. 12), the error after correction is given by −10%+4.7%=−5.3%. Thus, the correction performed in the prior art using the temperature sensor 1 is effective for the overall temperature characteristic, but a large error remains for the wall surface temperature characteristic because the correction amount provided from the computing unit 17 is relatively small.

On the other hand, the wall surface temperature characteristic after correction in the thermal air flowmeter according to the present invention is improved about 1% in comparison with that in the prior art. More specifically, as shown in FIG. 13, when the wall surface temperature is 80° C., the temperature of the temperature sensor 1 at the flow rate of 5 kg/h is about 60° C. Based on FIG. 10, the correction amount at that temperature is about 8.0%, i.e., (60° C.−20° C.)×12%/(80° C.−20° C.)).

In the present invention, therefore, because the flow rate detection error caused due to the wall surface temperature characteristic before correction is −12.5% (at 5 kg/h, see FIG. 12), the error after correction is given by −12.5%+8.0%=−4.5%. Thus, the error of −5.3% in the prior art is reduced by about 1% to −4.5% in the present invention.

The reason is that, as seen from Table 2 of FIG. 11, the error correction amount provided from the computing unit 17 in the present invention is larger than that in the prior art. Stated another way, the overall temperature characteristic is adjusted with the provision of the fixed resistor 6b, thus causing the computing unit 17 to modify the error correction amount such that the flow rate detection error is reduced in comparison with the error in the prior art.

According to the first embodiment of the present invention, it is possible to reduce the error in measurement accuracy of the fluid flowmeter, which is caused by external thermal influences, and to realize a thermal flowmeter of a fluid, which has improved measurement accuracy of the flowmeter.

The advantage of the first embodiment of the present invention can be obtained by combination of two features, i.e., the error correction using the temperature sensor 16 and the adjustment of the temperature characteristic using the fixed resistor 6b.

In other words, the overall temperature characteristic and the wall surface temperature characteristic cannot be corrected at the same time by an arrangement of only performing the error correction with the temperature sensor 16 or by an arrangement of only modifying the temperature characteristic with the additional connection of the fixed resistor 6b. The advantage of the first embodiment can be obtained only by combining those two features with each other.

The first embodiment of the present invention is featured in providing the function of adjusting the overall temperature characteristic before the error correction by the computing unit 17. Other embodiments for realizing that function will be described below.

Figure 15:
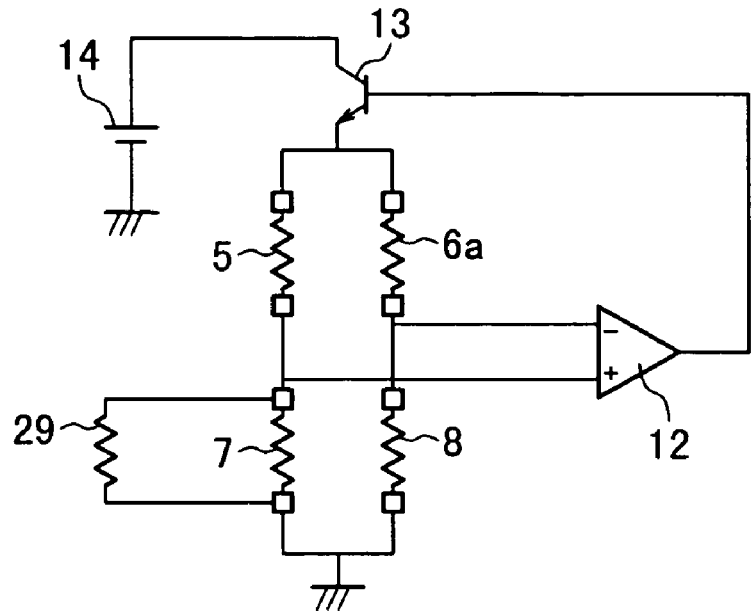
FIG. 15 is a diagram showing a drive circuit for the heating resistor in a second embodiment of the present invention.

FIG. 15 is a diagram showing a drive circuit for the heating resistor 5 in a second embodiment of the present invention. This drive circuit supplies a current to the heating resistor 5 on the measuring element 1 and performs heating temperature control.

The drive circuit shown in FIG. 15 differs from the drive circuit shown in FIG. 3 in that the resistor 6b is connected to the resistor 6a in parallel in the example of FIG. 3, while a resistor 29 is connected to the resistor 7 in parallel in the example of FIG. 15 instead of connecting the resistor 6b to the resistor 6a. The other arrangement in the example of FIG. 15 is the same as that in the example of FIG. 3.

Referring to FIG. 15, the heating resistor 5, the temperature compensation resistor 6a, the first resistor 7, and the second resistor 8, which are formed on the measuring element 1, are all made of the same resistor material, while the fixed resistor 29 is made of a different resistor material from that used for the resistors 5, 6a, 8 and 7. Those resistors form a bridge circuit.

The drive circuit in this second embodiment has the function similar to that of the drive circuit in the first embodiment. Although the fixed resistor 29 and the resistor 7 are connected in parallel in FIG. 15, the same effect is also obtained in the case of connecting those two resistors 7 and 29 in series.

The remaining arrangement is the same as that in the first embodiment. Namely, the computing unit 17 computes the air flow rate signal based on the temperature detection signal from the temperature sensor 16 and the correction amount information stored in the memory 18.

This second embodiment can also provide a similar advantage to that in the first embodiment.

Figure 16:
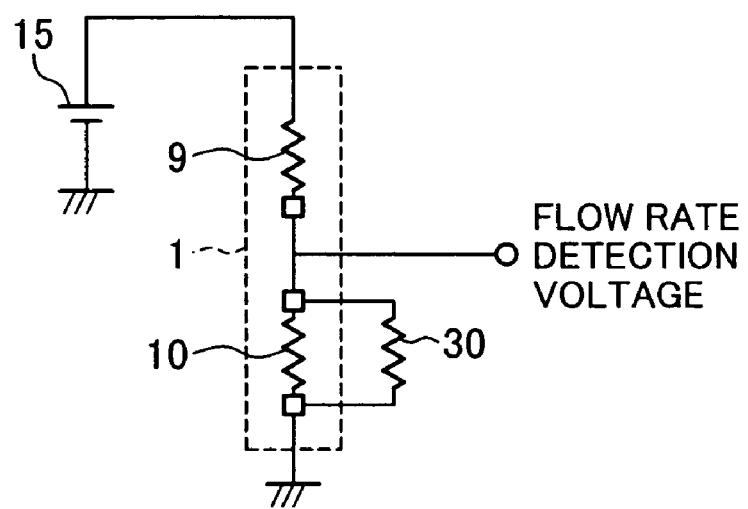
FIG. 16 is a diagram showing a flow rate detection circuit according to a third embodiment of the present invention.

FIG. 16 is a diagram showing a flow rate detection circuit according to a third embodiment of the present invention.

Referring to FIG. 16, the flow rate detection circuit comprises a first temperature measuring resistor 9 for detecting the flow rate, a second temperature measuring resistor 10 connected to the first temperature measuring resistor 9 in series, the first and second temperature measuring resistors 9, 10 being made of the same resistor material (polysilicon resistor), and a fixed resistor 30 connected to the resistor 10 in parallel and made of a material (having the resistance temperature coefficient=about 0 ppm/° C.) different from that of the resistors 9 and 10. The fixed resistor 30 may be connected to the second temperature measuring resistor 10 in series.

Figure 17:
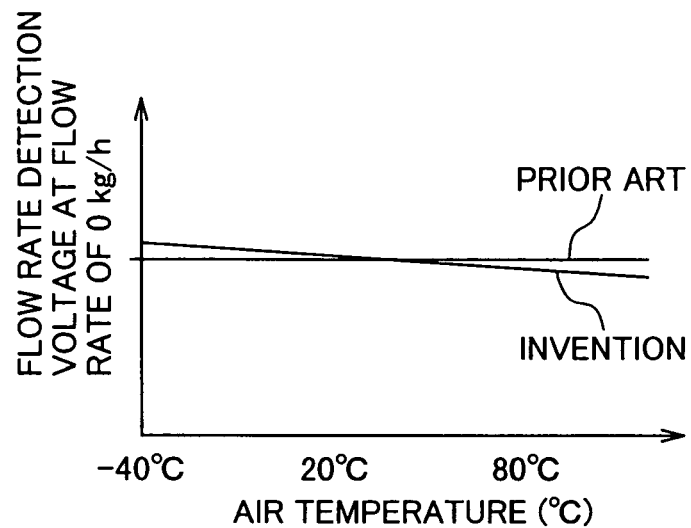
FIG. 17 is a graph showing dependency of an output voltage upon the air temperature at a flow rate of 0 kg/h in the flow rate detection circuit according to the third embodiment of the present invention.

FIG. 17 is a graph showing dependency of a flow rate detection voltage upon the air temperature at a flow rate of 0 kg/h.

As shown in FIG. 17, because the flow rate detection circuit of the prior art is a serial circuit made up of the resistors having the same resistance temperature coefficient, the flow rate detection voltage is constant regardless of changes the air temperature. In the third embodiment of the present invention, however, because the fixed resistor 30 is connected to the temperature measuring resistor 10, the flow rate detection voltage is reduced as the air temperature rises.

Figure 18:
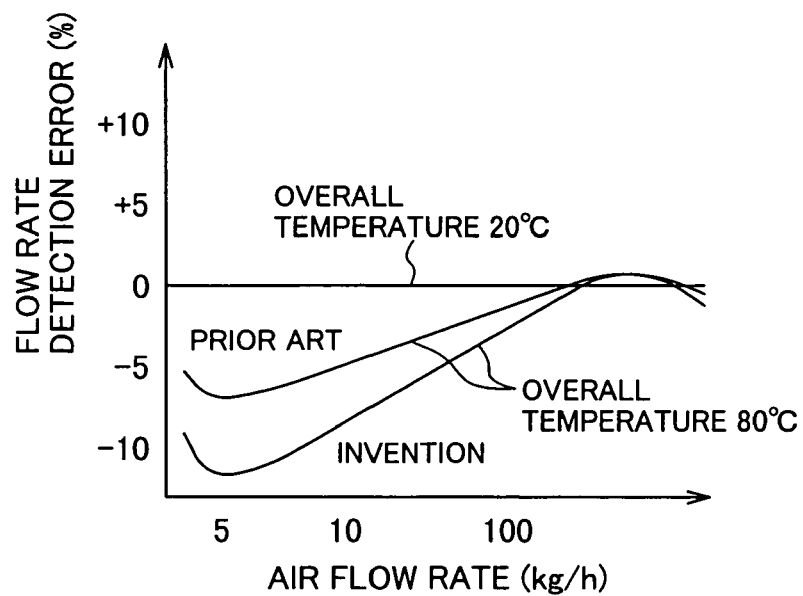
FIG. 18 is a graph representing a flow rate detection error caused due to an overall temperature characteristic in the third embodiment of the present invention.

Thus, by adjusting the dependency of the flow rate detection voltage (offset voltage) upon the air temperature at the air flow rate of 0 kg/h with the addition of the fixed resistor 30, the overall temperature characteristic can be adjusted particularly at a low rate as shown in FIG. 18.

The computing unit 17 computes the air flow rate by using the flow rate detection circuit having the overall temperature characteristic shown in FIG. 18, the temperature sensor 16 similar to that shown in FIG. 5, and the memory 18 storing a correction map in which relatively large correction amounts are set as shown in FIG. 11.

This third embodiment can also provide a similar advantage to that in the first embodiment.

Additionally, the flow rate detection error can be further reduced by employing one of the drive circuits according to the first and second embodiments and the flow rate detection circuit according to the third embodiment in a combined manner such that the temperature characteristic is adjusted by the fixed resistor 6b or 6c at a high flow rate and by the fixed resistor 30 at a low flow rate.

Figure 19:
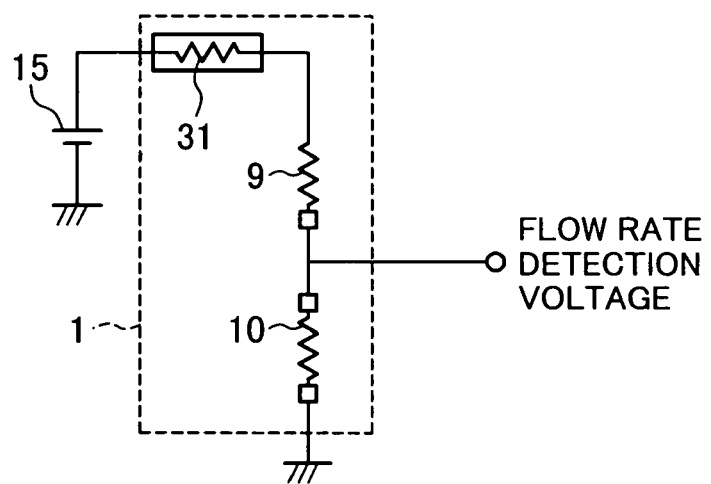
FIG. 19 is a diagram showing a flow rate detection circuit according to a fourth embodiment of the present invention.

FIG. 19 is a diagram showing a flow rate detection circuit according to a fourth embodiment of the present invention.

Referring to FIG. 19, the flow rate detection circuit comprises a first temperature measuring resistor 9 for detecting the flow rate, a second temperature measuring resistor 10 connected to the first temperature measuring resistor 9 in series, and a fixed resistor 31 connected to the first temperature measuring resistor 9 in series in parallel.

The fixed resistor 31 is made of a material, such as aluminum, having the resistance temperature coefficient larger than that of the first temperature measuring resistor 9 and the second temperature measuring resistor 10. The resistance temperature coefficient of aluminum is in the range of 3000-4000 ppm/° C. and is larger than that of the polysilicon resistance used to form the first temperature measuring resistor 9 and the second temperature measuring resistor 10. For that reason, the fixed resistor 31 is connected to the temperature measuring resistor 9.

In particular, aluminum is used to form the terminal electrodes 11 (see FIG. 1) of the measuring element 1, etc. Accordingly, the fixed resistor 31 can be formed by designing a wiring pattern such that the wiring resistance of the terminal electrode 11i or 11j connected to the first temperature measuring resistor 9 is increased. Thus, by adjusting the dependency of the flow rate detection voltage upon the air temperature at the flow rate of 0 kg/h with the addition of the fixed resistor 31, the overall temperature characteristic can be adjusted as in the third embodiment.

Figure 20:
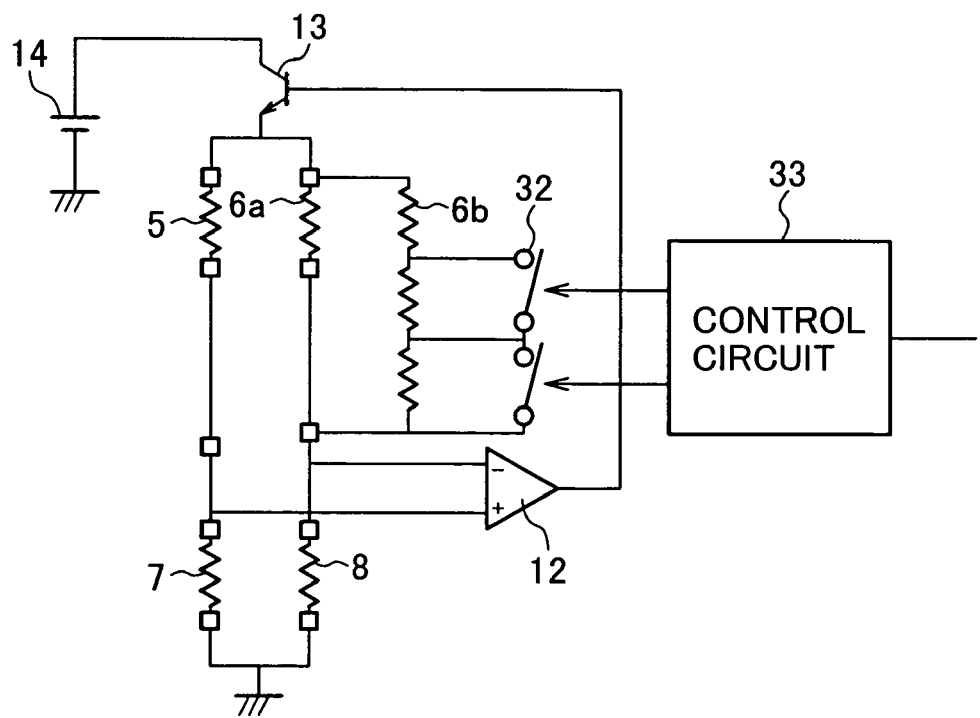
FIG. 20 is a diagram showing a drive circuit for performing heating temperature control in a fifth embodiment of the present invention.

FIG. 20 is a diagram showing a drive circuit for performing heating temperature control in a fifth embodiment of the present invention.

This fifth embodiment is similar to the first embodiment except for that the resistance value of the fixed resistor 6b connected to the resistor 6a in parallel can be selected by a switching device 32 and a control circuit 33 for controlling the former.

By constituting the switching device 32 as a semiconductor switch in the form of a transistor, for example, the switching device 32 can be manufactured together with the computing unit 17, etc. Similarly, the control circuit 33 can also be easily manufactured by manufacturing it together with the computing unit 17.

Further, the control circuit 33 for controlling the switching device 32 is preferably provided with a mechanism for communicating with the exterior of the thermal air flowmeter so that the resistance value of the resistor 6b can be adjusted with ease.

For example, when polysilicon is used as the material of the resistors constituting the bridge circuit as in the first embodiment, the resistance value of each resistor has a manufacturing variation of about ±20%. In view of such a variation of the resistance value, this fifth embodiment is constituted to be able to adjust the resistance value of the fixed resistor 6b depending on the variation of the actual polysilocon resistance value.

The other arrangement of the fifth embodiment is the same as that of the first embodiment, and a detailed description thereof is omitted here.

Additionally, this fifth embodiment may be combined with one or more of the second to fourth embodiments described above.

While, in the example shown in FIG. 3, the fixed resistor 6b is in the form of a resistance printed on the circuit board 26, it is not always required to form the fixed resistor 6b as a printed resistance. Also, the resistor 6b may be disposed in a position separate from the circuit board 26.

While, in the first embodiment, the fixed resistor 6b is connected to the temperature compensation resistor 6a in parallel, the additional connection of the fixed resistor 6b is not always required if the temperature coefficient of the temperature compensation resistor 6a can be set to have such a characteristic that the temperature difference relative to the air temperature is reduced as the temperature rises, as shown in FIG. 4.

Further, while, in the third embodiment, the fixed resistor 30 is connected to the temperature measuring resistor 10 in parallel, the additional connection of the fixed resistor 30 is not always required if the temperature coefficient of the temperature measuring resistor 10 can be set to have such a characteristic that the offset amount of the flow rate detection voltage at the air flow rate of 0 kg/h is changed to the negative side as the temperature rises, as shown in FIG. 18.

INDUSTRIAL APPLICABILITY

According to the present invention, the thermal air flowmeter comprises the temperature sensor 16 disposed in a casing 23 of the air flowmeter, the computing unit 17 for correcting the flow rate detection voltage from the measuring element 1 by using the temperature sensor 16, and heating temperature control means disposed in a temperature control circuit for performing temperature control of the heating resistor 5 to vary a temperature rise of the heating resistor 5 relative to the air temperature depending on the air temperature.

Therefore, the flow rate detection errors of the thermal air flowmeter caused by the overall temperature change and the temperature change on the intake passage wall surface can be corrected simultaneously and the thermal air flowmeter having superior measurement accuracy can be realized.

The present invention is not limited the thermal air flowmeter in its applications, and it can be further applied to a thermal fluid flowmeter for measuring another fluid, e.g., any other kind of gas.

The invention claimed is:

1. A thermal flowmeter of a fluid, comprising:
    a flow rate measuring element disposed in a fluid passage and including a heating resistor generating heat with supply of a current, a temperature compensation resistor for detecting a fluid temperature, a first temperature measuring resistor for measuring a temperature upstream of said heating resistor, and a second temperature measuring resistor for measuring a temperature downstream of said heating resistor, all of said resistors being formed on the same substrate;
    a temperature control circuit for controlling a temperature of said heating resistor;
    a casing supported to a wall surface of an intake pipe forming said fluid passage and supporting said flow rate measuring element;
    a temperature sensor for measuring a temperature in said casing;
    a computing unit for receiving signals corresponding to a fluid flow rate from said first and second temperature measuring resistors, performing correction depending on temperature by using said temperature sensor, and outputting the corrected result; and
    heating temperature control means causing a difference between the fluid temperature and the temperature of said heating resistor to be changed depending on the fluid temperature.

2. The thermal flowmeter of the fluid according to claim 1, wherein said heating temperature control means forms a bridge circuit in cooperation with said heating resistor, said temperature compensation resistor, a first resistor and a second resistor, and said temperature compensation resistor differs in resistance temperature coefficient from said heating resistor, said first resistor, and said second resistor, thereby causing the heating temperature to be lowered as the air temperature rises.

3. The thermal flowmeter of the fluid according to claim 1, wherein said heating resistor, said temperature compensation resistor, a first resistor and a second resistor are all made of the same resistor material and form a bridge circuit, and a fixed resistor differing in resistance temperature coefficient from said resistor material is connected to said temperature compensation resistor in parallel.

4. A thermal flowmeter of a fluid, comprising:
    a flow rate detecting element disposed in a fluid passage and including a heating resistor generating heat with supply of a current, and first and second temperature detecting resistors for measuring respective temperatures upstream and downstream of said heating resistor, all of said resistors being formed on the same substrate;
    a temperature control circuit for controlling a temperature of said heating resistor;
    a flow rate detecting circuit for taking out signals corresponding to a fluid flow rate from said first and second temperature detecting resistors;
    a casing supported to a wall surface of an intake pipe forming said fluid passage and supporting said flow rate measuring element;
    a temperature sensor for measuring a temperature in said casing;
    a computing unit for receiving the signals corresponding to the fluid flow rate from said first and second temperature detecting resistors, performing correction depending on temperature by using said temperature sensor, and outputting the corrected result; and
    a resistor having a resistance temperature coefficient different from the temperature coefficient of the first temperature measuring resistor and the second temperature measuring resistor, being connected to said flow rate detecting circuit to change an offset voltage provided as an output voltage of said flow rate detecting circuit at a flow rate of zero to be changed depending on an ambient temperature.

5. The thermal flowmeter of the fluid according to claim 4, wherein said flow rate detecting circuit includes a serial circuit of said first temperature measuring resistor and said second temperature measuring resistor.

* * * * *